J. J. Watson,
Water Wheel.

N° 30,274. Patented Oct. 2, 1860.

Witnesses:
A. A. Yeatman
C. M. Alexander

Inventor:
John J. Watson

UNITED STATES PATENT OFFICE.

JOHN J. WATSON, OF BUFFALO, NEW YORK.

WATER-WHEEL.

Specification of Letters Patent No. 30,274, dated October 2, 1860.

*To all whom it may concern:*

Be it known that I, JOHN J. WATSON, of Buffalo, in the county of Erie and State of New York, have invented certain new and useful Improvements in Water-Wheels; and I do hereby declare that the following is a full, clear, and exact description of the same, reference being had to the accompanying drawings and to the letters of reference marked thereon.

The nature of my invention consists in constructing and arranging the several parts of this wheel in the manner hereinafter specified.

Figure 3:
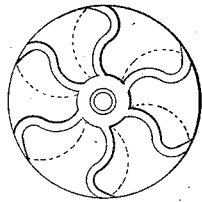
Figures 2, 4:
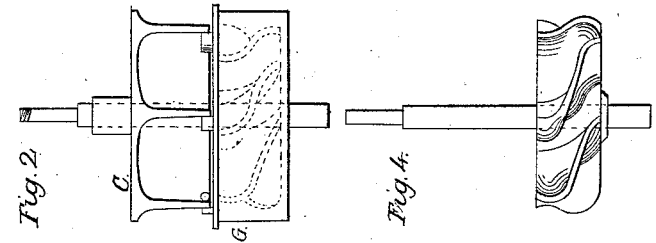
Figure 1:
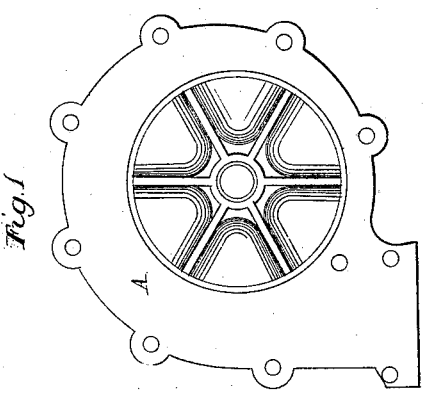
Figure 7:
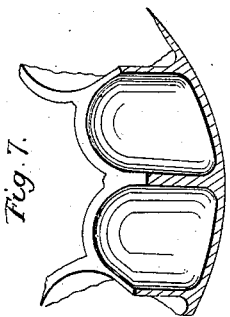
Figure 6:
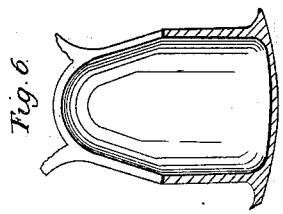
Figure 5:
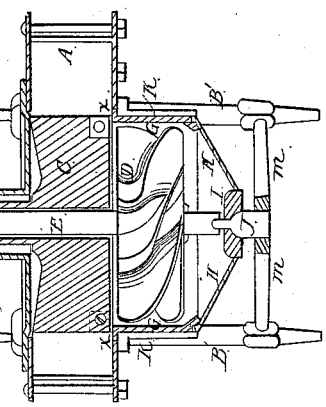

In the annexed drawings, Figure 1 represents a plan view. Fig. 2 is a view of the two wheels detached one being seen in section. Fig. 3 is a top view of the lower wheel. Fig. 4 is a side view of the lower wheel. Fig. 5 is a vertical section of the scroll and wheels. Figs. 6 and 7 are views of the buckets of the top wheel.

In the figures A, represents a scroll, which is made in the usual shape and manner.

B, B, and B', B', represent supports which project out from the two sides of the scroll as seen in Fig. 5. From the supports B, B, the guides L, L, project for the purpose of holding the upper portions of the shafts of the wheels in proper position. From the lower supports B', B', the support M, projects, which sustains the step J, upon which the wheel shafts rest.

C, represents the upper wheel, which is provided with a hollow shaft F. This wheel is composed of a series of peculiar shaped buckets. The shape to which these buckets most nearly approximate, is that of the quarter of an oval, (the oval being cut in half longitudinally and then cut cross wise through the center). If the oval is placed upon a plane after being cut with its end up, standing in a vertical position, it will represent the position of one of the buckets of the upper wheel, and we will have about the shape of said bucket. The wheel is formed of a series of these buckets placed around a common center.

G, represents a cylinder which surrounds the lower wheel D, as seen in Fig. 5, but is independent of it, being connected to the upper wheel as seen at *x*, *x*. To the lower part of the cylinder G, arms H, H, extend out and connect with a collar I, which is provided with a socket on its under side, which fits on a step J.

E, represents the shaft of the lower wheel—said shaft passes through the center of the upper wheel and through its hollow shaft F. The lower end of the shaft E, is provided with a socket which rests upon the top of the step J.

D, represents the lower wheel, which consists of a series of spiral wings, placed around its shaft E. The wings of this wheel are made as nearly as possible to correspond with the shape represented in the drawings, Figs. 3, 4, and 5.

When water is allowed to enter the mouth of the scroll and strike the wheels, it first comes in contact with the upper wheel C, and after exerting power upon it, it passes down, and exerts still further power upon the wheel D. These two wheels both run in the same direction and the centrifugal action of the water as it passes from the upper wheel exerts its power upon the sides of the revolving cylinder G. The two wheels, are entirely disconnected with each other as here represented, and run independently of each other. They may be connected, however, when desired by means of pulleys or gear wheels attached to their respective shafts. By this arrangement I obtain the natural velocity of the water upon the upper wheel, while I am enabled to drive the lower wheel at double the velocity of the water. Thus the wheels are moving at different velocities and of course the gearing which connects them must be made to correspond with the velocities of each.

One great advantage derived from the form and shape and position of the buckets of the upper wheels is that the water is properly guided to the lower wheel at the same time raising said upper wheel, so as to take away the weight of the wheel from the step J, and thus diminish the friction upon the step, not only that, but, taking the friction which would otherwise be upon the cap or top of the scroll applies it as power upon the shaft F, where said power is required. The lower wheel of course, turns with a velocity greater than the upper, receiving as it does, the pressure of the water imparted by the upper series of buckets or guides, the water being longer retained owing to the peculiar shape, of the lower series which is so formed as to retain the impact of the water as long as it may be effective.

In my double wheel I am enabled to obtain the best percentage of the power from each wheel, as they are independent of each other and may be both run, at velocities due to the conditions of the force of the current and the weight or impact of the water.

Having thus fully described my invention, what I claim as new and desire to secure by Letters Patent, is—

1. The wheel C, consisting of a series of buckets made and placed substantially in the form and position herein represented, together with the cylinder G, and its arms H, H, and collar I, as set forth.

2. The lower wheel as constructed revolving independently in the cylinder G, and used separately or in connection with the wheel C, when the whole are constructed and arranged to operate substantially as specified.

JOHN J. WATSON.

Witnesses:
C. M. ALEXANDER,
A. A. YETTMAN.